(12) United States Patent
Sbandi

(10) Patent No.: US 11,316,883 B2
(45) Date of Patent: Apr. 26, 2022

(54) CYBERSECURITY—OPERATIONAL RESILIENCE OF COMPUTER NETWORKS

(71) Applicant: Bank of America Corporation, Charlotte, NC (US)

(72) Inventor: Michael J. Sbandi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 322 days.

(21) Appl. No.: 16/514,474

(22) Filed: Jul. 17, 2019

(65) Prior Publication Data
US 2021/0021628 A1   Jan. 21, 2021

(51) Int. Cl.
*H04L 29/06* (2006.01)

(52) U.S. Cl.
CPC ...... *H04L 63/1433* (2013.01); *H04L 63/0245* (2013.01); *H04L 63/1416* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | |
|---|---|---|
| 8,856,936 B2 | 10/2014 | Datta Ray et al. |
| 9,294,998 B2 | 3/2016 | McDiarmid et al. |
| 9,319,420 B1 | 4/2016 | Franke et al. |
| 9,426,169 B2 | 8/2016 | Zandani |
| 9,521,160 B2 | 12/2016 | Ng et al. |
| 9,699,209 B2 | 7/2017 | Ng et al. |
| 9,749,343 B2 | 8/2017 | Watters et al. |
| 9,749,344 B2 | 8/2017 | Watters et al. |
| 9,930,061 B2 | 3/2018 | Zandani |
| 9,998,481 B2 | 6/2018 | Temm |
| 10,050,990 B2 | 8/2018 | Ng et al. |
| 10,063,583 B2 | 8/2018 | Watters et al. |
| 2014/0137257 A1* | 5/2014 | Martinez ............ H04L 63/1433 726/25 |

(Continued)

OTHER PUBLICATIONS

Cybersecurity Dilemmas, Technology, Policy, and Incentives: Summary of Discussions at the 2014 Raymond and Beverly Sackler US-UK Scientific Forum, copyright National Academy of Sciences, 36 pp.

(Continued)

*Primary Examiner* — Yogesh Paliwal
*Assistant Examiner* — Hassan Saadoun
(74) *Attorney, Agent, or Firm* — Banner & Witcoff, Ltd.

(57) ABSTRACT

A plurality of communicatively coupled, networked assets may be threatened or attacked by a cybersecurity attack. The operational resiliency of the computer network determines whether the cybersecurity attack leads to a shutdown of one or more assets, or even the entire computer network. A cybersecurity server selectively restricts and controls the data flow over the network and transforms a configurable, networked asset from a low, medium, and high cybersecurity mode. The cybersecurity server may reside on a firewall device or other networked device, and adjusts the cybersecurity mode based on a criticality score that measures the operational resiliency of the computer network. The criticality score changes as cybersecurity threats or attacks are identified and as mitigation strategies are implemented on the networked assets.

20 Claims, 11 Drawing Sheets

(56) References Cited

U.S. PATENT DOCUMENTS

| | | | |
|---|---|---|---|
| 2014/0173739 A1* | 6/2014 | Ahuja | G06F 21/568 |
| | | | 726/25 |
| 2015/0295948 A1* | 10/2015 | Hassell | H04L 63/1433 |
| | | | 726/25 |
| 2016/0034838 A1 | 2/2016 | Gembicki | |
| 2017/0242987 A1* | 8/2017 | Williams | G06F 21/577 |
| 2018/0359276 A1 | 12/2018 | Ng et al. | |
| 2019/0207981 A1* | 7/2019 | Sweeney | H04L 41/0686 |
| 2019/0220374 A1* | 7/2019 | Wei | G06F 11/2023 |
| 2019/0253440 A1* | 8/2019 | Mathur | H04L 63/1416 |

OTHER PUBLICATIONS

Bank of England, (Jul. 2018), 48 pp.

* cited by examiner

| Criticality @t0 | | | | | | | | |
|---|---|---|---|---|---|---|---|---|
| *Applicable Assets and Data flows* | | | | | | | | |
| App Server 1 | | | 1 | | 0 | | 1 | 1 |
| App Server 2 | | | 0 | | 1 | | 1 | 1 |
| ACIS DB 1 | | | 1 | | 1 | | 0 | 0 |
| ACIS DB 2 | | | 1 | | 1 | | 0 | 0 |
| ACIS DB 3 | | | 1 | | 0 | | 1 | 1 |
| *Importance of Assets and Data Flows* | | | | | | | | |
| App Server 1 | | | 0.001968311 | | 0.971363716 | 0.830433467 | 0.913756482 | 0.173975529 |
| App Server 2 | | | 0.203282549 | | 0.288576338 | 0.175847474 | 0.065926342 | 0.074428675 |
| ACIS DB 1 | | | 0.36989167 | | 0.648351734 | 0.657358935 | 0.179745444 | 0.428022313 |
| ACIS DB 2 | | | 0.264501868 | | 0.763576206 | 0.364811671 | 0.626334671 | 0.280399142 |
| ACIS DB 3 | | | 0.981351647 | | 0.282397517 | 0.06508903 | 0.921483988 | 0.824478059 |
| *P(X) Asset or Data Flow is Fully Functional During Current Attack* | | | | | | | | |
| App Server 1 | | | 1 | | 1 | 1 | 1 | 1 |
| App Server 2 | | | 1 | | 1 | 1 | 1 | 1 |
| ACIS DB 1 | | | 1 | | 1 | 1 | 1 | 1 |
| ACIS DB 2 | | | 1 | | 1 | 1 | 1 | 1 |
| ACIS DB 3 | | | 1 | | 1 | 1 | 1 | 1 |
| *Importance of Asset or Data Flow Given the P(X) it Remains Functional During an Attack* | | | | | | | | |
| App Server 1 | | | 0.001968311 | | 0.971363716 | 0.830433467 | 0.913756482 | 0.173975529 |
| App Server 2 | | | 0.203282549 | | 0.288576338 | 0.175847474 | 0.065926342 | 0.074428675 |
| ACIS DB 1 | | | 0.36989167 | | 0.648351734 | 0.657358935 | 0.179745444 | 0.428022313 |
| ACIS DB 2 | | | 0.264501868 | | 0.763576206 | 0.364811671 | 0.626334671 | 0.280399142 |
| ACIS DB 3 | | | 0.981351647 | | 0.282397517 | 0.06508903 | 0.921483988 | 0.824478059 |
| | | | | | t0 | | Numerator | 8.307966397 |
| | | | | | | | Denominator | 8.307966397 |
| | | | | | | | Criticality Score | 1 |

FIG. 6A

| Criticality @t1 | | | | | |
|---|---|---|---|---|---|
| Attack 1 | | | | | |
| *Impact of Attack1* | | | | | |
| App Server 1 | 0.306060694 | 0.253383606 | 0.985708749 | 0.287487637 | 0.243951511 |
| App Server 2 | 0.398087659 | 0.981643108 | 0.023443308 | 0.652936913 | 0.427428608 |
| ACIS DB 1 | 0.949868861 | 0.149627324 | 0.15281579 | 0.47874438 | 0.296303812 |
| ACIS DB 2 | 0.325250296 | 0.029507105 | 0.083332046 | 0.193946061 | 0.435890145 |
| ACIS DB 3 | 0.487584 | 0.276203297 | 0.937202797 | 0.343542361 | 0.659969098 |
| *P(X) Asset or Data Flow is Fully Functional During Current Attack* | | | | | |
| App Server 1 | 0.693939306 | 0.746816394 | 0.014291251 | 0.712512363 | 0.755045489 |
| App Server 2 | 0.601912341 | 0.018356832 | 0.976556692 | 0.347063087 | 0.572571392 |
| ACIS DB 1 | 0.050131139 | 0.851372676 | 0.84718421 | 0.5212556 | 0.703666188 |
| ACIS DB 2 | 0.674749704 | 0.970492895 | 0.911667954 | 0.806053939 | 0.564109855 |
| ACIS DB 3 | 0.512416 | 0.723796703 | 0.062797203 | 0.656457639 | 0.340030902 |
| *Importance of Asset or Data Flow Given the P(X) It Remains Functional During an Attack* | | | | | |
| App Server 1 | 0.001385888 | 0.725236075 | 0.011867933 | 0.651062791 | 0.131533936 |
| App Server 2 | 0.122358275 | 0.005297365 | 0.171725027 | 0.0228806 | 0.04261573 |
| ACIS DB 1 | 0.018543091 | 0.551988895 | 0.5569041 | 0.093693323 | 0.299780278 |
| ACIS DB 2 | 0.178472422 | 0.741045283 | 0.332587109 | 0.504859529 | 0.158175919 |
| ACIS DB 3 | 0.502860286 | 0.204398392 | 0.034086153 | 0.604915203 | 0.280348018 |
| | | | t1 | Numerator | 4.910356462 |
| | | | | Denominator | 8.307966397 |
| | | | | Criticality Score | 0.591041926 |

FIG. 6B

Criticality @t2

Attack 1

Impact of Attack1

| | | | | | Impact of Recovery effort | |
|---|---|---|---|---|---|---|
| App Server 1 | 0.206060694 | 0.153383606 | 0.885708749 | | 0.187487637 | 0.143951511 |
| App Server 2 | 0.238087659 | 0.881643108 | 0 | | 0.552936913 | 0.327423608 |
| ACIS DB 1 | 0.849988861 | 0.046627324 | 0.05281579 | | 0.37874438 | 0.196303812 |
| ACIS DB 2 | 0.225250296 | 0 | 0 | | 0.093946061 | 0.335890145 |
| ACIS DB 3 | 0.387584 | 0.176203297 | 0.837202797 | | 0.243542361 | 0.599980798 |

P(X) Asset or Data Flow is Fully Functional During Current Attack

| App Server 1 | 0.793939306 | 0.846616394 | 0.114291251 | | 0.812512363 | 0.856048489 |
| App Server 2 | 0.701912341 | 0.118356892 | 1 | | 0.447063087 | 0.672571392 |
| ACIS DB 1 | 0.150131139 | 0.951372676 | 0.94718421 | | 0.62125562 | 0.803636188 |
| ACIS DB 2 | 0.774749704 | 1 | 1 | | 0.906053939 | 0.664109855 |
| ACIS DB 3 | 0.612416 | 0.823796703 | 0.162797203 | | 0.756457639 | 0.440030902 |

Importance of Asset or Data Flow Given the P(X) it Remains Functional During an Attack

| App Server 1 | 0.001562719 | 0.822372447 | 0.09491128 | | 0.742438439 | 0.148931489 |
| App Server 2 | 0.14288653 | 0.034154998 | 0.175847474 | | 0.029473224 | 0.050058597 |
| ACIS DB 1 | 0.055532258 | 0.616824124 | 0.622640004 | | 0.111867867 | 0.342392509 |
| ACIS DB 2 | 0.204922589 | 0.763576206 | 0.364811671 | | 0.567492996 | 0.186215833 |
| ACIS DB 3 | 0.600995451 | 0.232638144 | 0.010593056 | | 0.697063802 | 0.352795824 |

| | | | t2 | | Numerator | 5.669607497 |
| | | | | | Denominator | 8.307960397 |
| | | | | | Criticality Score | 0.682430239 |

FIG. 6C

| Criticality @t3 | | | | | |
|---|---|---|---|---|---|
| Attack 1 | | | | | |
| *Impact of Attack1* | | | | | Impact of Recovery effort |
| App Server 1 | | 0 | 0 | 0 | -1 |
| App Server 2 | | 0 | 0 | 0 | 0 |
| ACIS DB 1 | | 0 | 0 | 0 | 0 |
| ACIS DB 2 | | 0 | 0 | 0 | 0 |
| ACIS DB 3 | | 0 | 0 | 0 | 0 |
| *P(X) Asset or Data Flow is Fully Functional During Current Attack* | | | | | |
| App Server 1 | | 1 | 1 | 1 | 1 |
| App Server 2 | | 1 | 1 | 1 | 1 |
| ACIS DB 1 | | 1 | 1 | 1 | 1 |
| ACIS DB 2 | | 1 | 1 | 1 | 1 |
| ACIS DB 3 | | 1 | 1 | 1 | 1 |
| *Importance of Asset or Data Flow Given the P(X) It Remains Functional During an Attack* | | | | | |
| App Server 1 | 0.001968311 | 0.971363716 | 0.830433467 | 0.913756482 | 0.173975529 |
| App Server 2 | 0.203282549 | 0.288576338 | 0.175847474 | 0.065926342 | 0.074428875 |
| ACIS DB 1 | 0.36989167 | 0.648351734 | 0.657356935 | 0.179745444 | 0.426022513 |
| ACIS DB 2 | 0.264501868 | 0.763578206 | 0.364811671 | 0.626334871 | 0.280399142 |
| ACIS DB 3 | 0.981351647 | 0.282397517 | 0.08506903 | 0.921483988 | 0.824478059 |
| | | | t3 | Numerator | 8.307965397 |
| | | | | Denominator | 8.307965397 |
| | | | | Criticality Score | 1 |

FIG. 6D

CYBERSECURITY—OPERATIONAL RESILIENCE OF COMPUTER NETWORKS

TECHNICAL FIELD OF DISCLOSURE

The present disclosure relates to methods, systems, and computing platforms for measuring the operational resilience of a computer network under the threat of cybersecurity attacks. In particular, the present disclosure discloses method steps and systems to mitigate cybersecurity threats and/or attacks in order to improve the operational resiliency of the computer network.

BACKGROUND

The National Academy of Sciences (NAS) reported in 2014: the introduction of the Internet and the World Wide Web has revolutionized the ways we work and access information, such that we are steadily more reliant on networked, digital technology. A single global digital infrastructure has been created as a platform, and as a result, cybersecurity is a growing concern for organizations. Massive pools of personal information and other data is being shared and stored online, creating a vulnerability to attack and exploitation by bad actors.

Providing cybersecurity typically means that trade-offs have to be made among the desired attributes of systems, the NAS also reported in 2014. Setting priorities can guide these trade-offs. For example, the computing world could be divided into more and less safe/accountable sectors, and centralized management and mechanisms to control inputs into those sectors may be provided for those that require more security. Another way to establish priorities could be to make it harder to target important assets; most accounts contain relatively low-value assets, and attackers cannot target everyone with the most sophisticated possible attacks. However, weakly protected accounts may become more valuable over time as people use them more and for more things. For instance, basic e-mail accounts should be viewed as extremely sensitive because they are often used to reset passwords. Yet the security on the accounts may not be upgraded in line with their increase in value over time, rendering these aspects more vulnerable.

Furthermore, a July 2018 discussion paper by The Bank of England advocated for building the UK financial sector's operational resilience. The paper promoted a paradigm shift that encouraged financial institutions to consider cyber threat as a primary risk factor and assume that operational disruptions will occur. The paper suggested that the concept of operational resilience is an evolution of current business continuity and disaster recovery response, because it emphasizes the potential impact of cyber-attacks and accounts for operational processes and services. The paper advocated a business-services approach to operational resilience, while recommending that testing/planning address the probabilistic nature of severe-but-plausible scenarios.

The disclosure addresses one or more of the shortcomings in the industry, thus improving the operational resiliency of a computer network.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a cybersecurity adaptation system to improve operational resiliency of a computer network, the system including: a matrix representation of a plurality of communicatively coupled, networked assets, where a first asset of the plurality of networked assets communicating a data flow to a second asset of the plurality of networked assets, where the first asset and the data flow correspond to an asset-data flow pairing stored in the matrix representation, where the plurality of networked assets include: a database server device; an application server device; a web server device; a user terminal; and a firewall device configured to selectively restrict the data flow from the first asset to the second asset, where the matrix representation of the plurality of networked assets is stored in a tangible computer memory; and a cybersecurity server configured to measure a cybersecurity threat to at least one of the plurality of networked assets by: in response to detecting the cybersecurity threat, updating, by a computer processor of the cybersecurity server, the asset-data flow pairing stored in the matrix representation to indicate that at least the second asset is effected by the cybersecurity threat; analyzing a system of record associated with the plurality of networked assets to update the matrix representation with current asset-data flow pairings; recording in the matrix representation, by the computer processor of the cybersecurity server, an importance value corresponding to a plurality of asset-data flow pairings stored in the matrix representation; calculating a criticality score using the matrix representation based on a criticality function; and transforming the firewall device from one cybersecurity mode to another cybersecurity mode that increases the selective restricting of the data flow from the first asset to the second asset to improve the operational resiliency of the computer network.

Implementations may include one or more of the following features. The system where in the firewall device is configurable to operate in a low, medium, or high cybersecurity mode, and where the selectively restricting by the firewall device blocks the data flow more when the firewall device is in a high cybersecurity mode than when the firewall device is in a low cybersecurity mode. The system further including a predictive analytics engine configured to calculate a magnitude of effect on the second asset by the cybersecurity threat.

In addition, another general aspect includes a tangible, non-transitory computer-readable medium storing computer-executable instructions that, when executed by a computer processor, cause a cybersecurity server to: generate, by the computer processor, a matrix representation of a plurality of networked assets communicatively coupled together, by analyzing a system of record associated with the plurality of networked assets; store, in a computer memory by the computer processor, the matrix representation, where the matrix representation includes asset-data flow pairings corresponding to the assets of the plurality of networked assets and their connectivity; update, by the computer processor, the asset-data flow pairings in the matrix representation to indicate that assets are effected by a cybersecurity threat; record in the matrix representation, by the computer processor, an importance value corresponding to a plurality of asset-data flow pairings stored in the matrix representation; calculate, by the computer processor, a criticality score using the matrix representation based on a criticality function; and transform a configuration of a computer network communicatively coupled to the cybersecurity server, to improve operational resiliency of the computer network by altering a cybersecurity mode of at least one asset of the plurality of networked assets to another cybersecurity mode, where the anther cybersecurity mode causes selective restricting of data flow between the plurality of networked assets.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of a, an, and the include plural referents unless the context clearly dictates otherwise.

BRIEF DESCRIPTION OF THE DRAWINGS

FIG. 6A, FIG. 6B, FIG. 6C, and FIG. 6D are an illustrative representation in tabular form of data analyzed to calculate the operational resiliency of a computer network, in accordance with one or more implementations.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

The description includes a plurality of communicatively coupled, networked assets that are threatened or attacked by a cybersecurity attack. The operational resiliency of the computer network determines whether the cybersecurity attack leads to a shutdown of one or more assets, or even the entire computer network. A cybersecurity server selectively restricts and controls the data flow over the network and transforms a configurable, networked asset from a low, medium, and high cybersecurity mode. The cybersecurity server may reside on a firewall device or other networked device, and adjusts the cybersecurity mode based on a criticality score that measures the operational resiliency of the computer network. The criticality score changes as cybersecurity threats or attacks are identified and as mitigation strategies are implemented on the networked assets.

Figure 1:
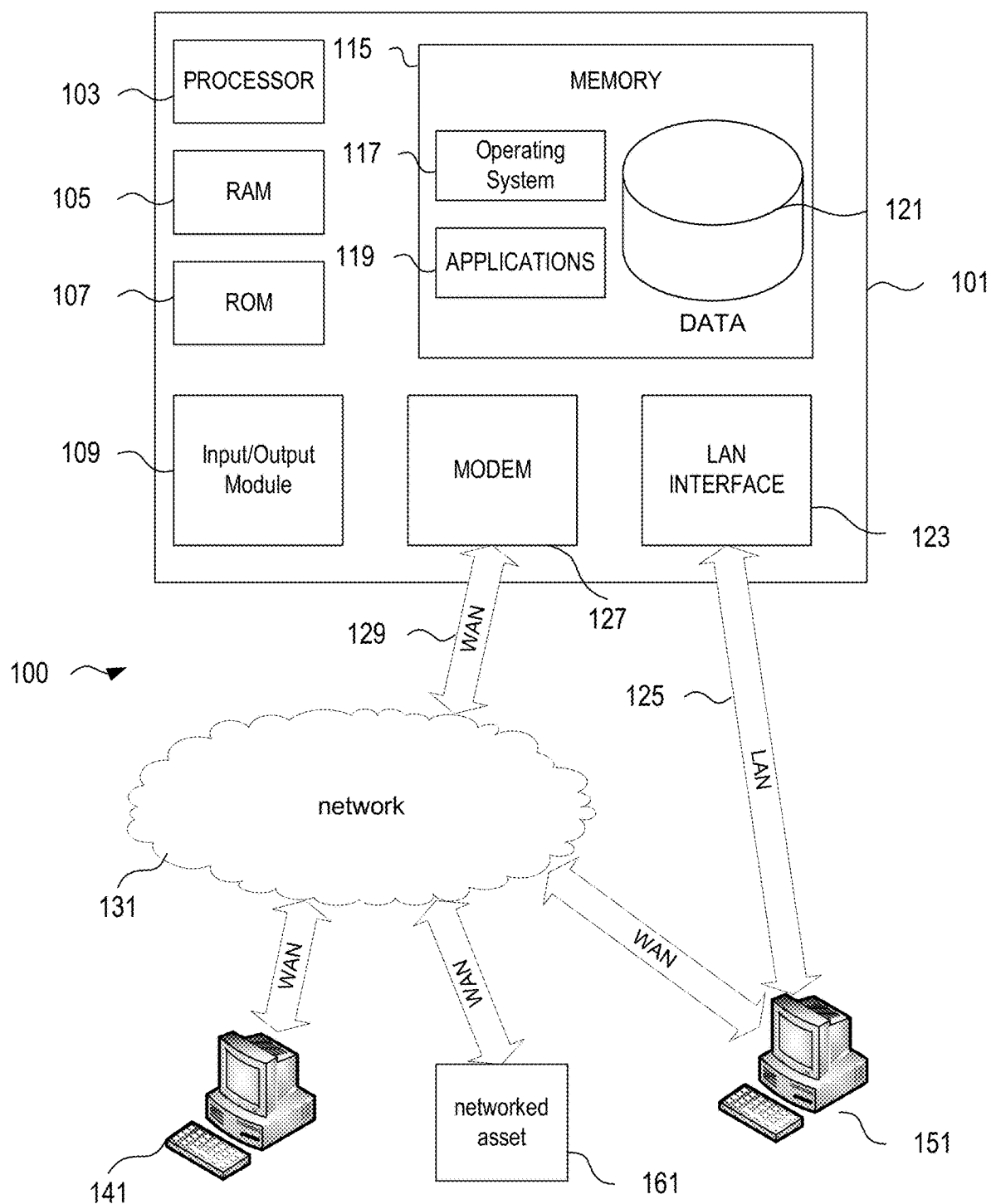
FIG. 1 illustrates a schematic diagram of a digital computing environment in which certain aspects of the present disclosure may be implemented.

FIG. 1 illustrates a system 100 block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151 and networked asset 161. The terminals 141 and 151 may be personal computers or servers that include many or all of the elements described above relative to the server 101. The networked asset 161 may be similar to terminals 141 and 151, or may be a database server device, an application server device, a web server device, a firewall device, or any other computerized asset electrically connected to the network 131. In one example, networked asset 161 may be a software application operating on a terminal device 151; the software application may be a smartphone application or may be a web browser-based application. Computing device 101, terminals 141 or 151, and/or networked asset 161 may also be mobile terminals including various other components, such as a battery, speaker, and antennas (not shown).

The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the network 131 (e.g., Internet). It will be appreciated that the network connections shown are illustrative and other means of establishing a communications link between the computers may be used. The existence of any of various protocols such as TCP/IP, Ethernet, FTP, HTTP and the like is presumed.

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
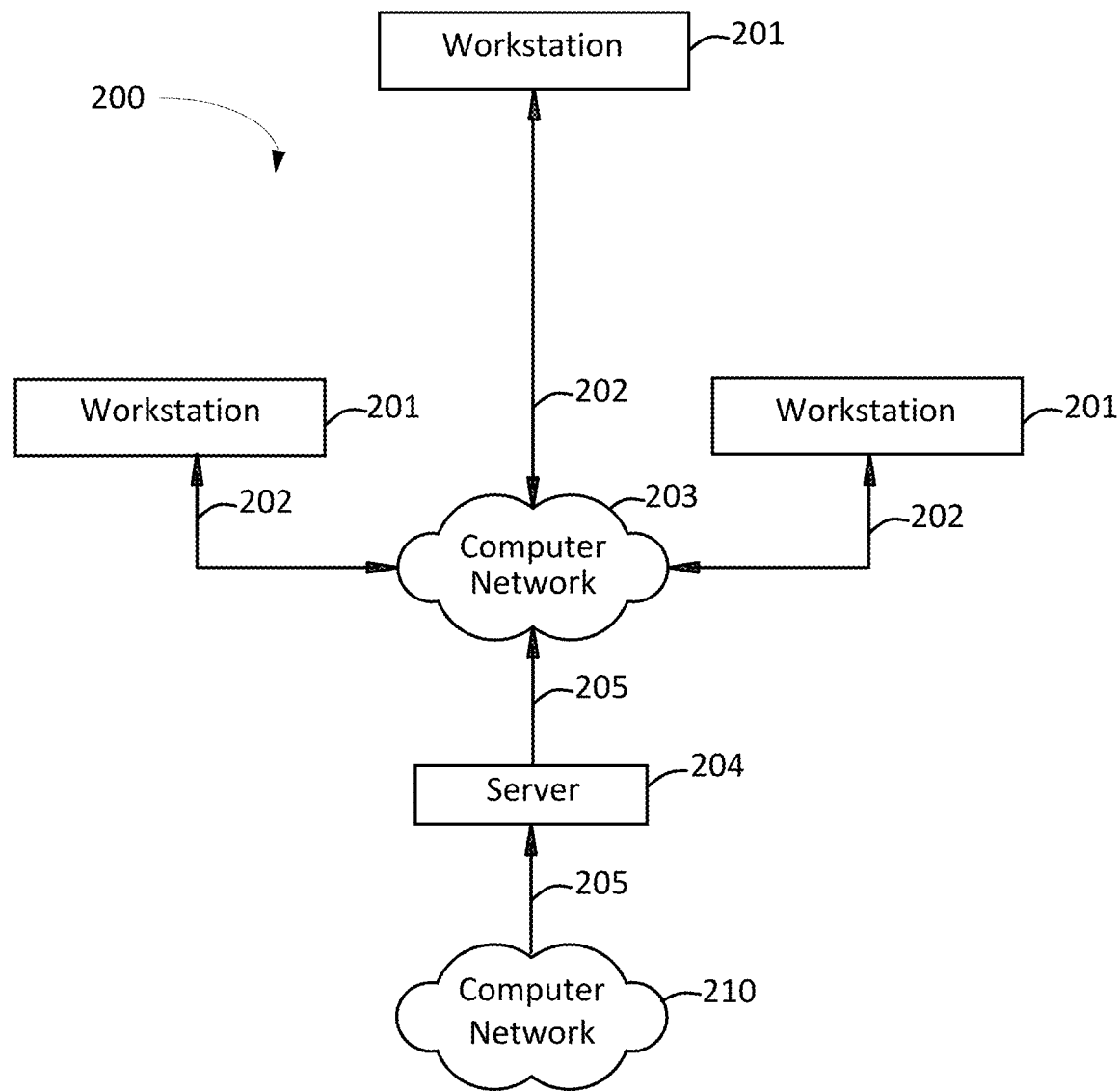
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 4:
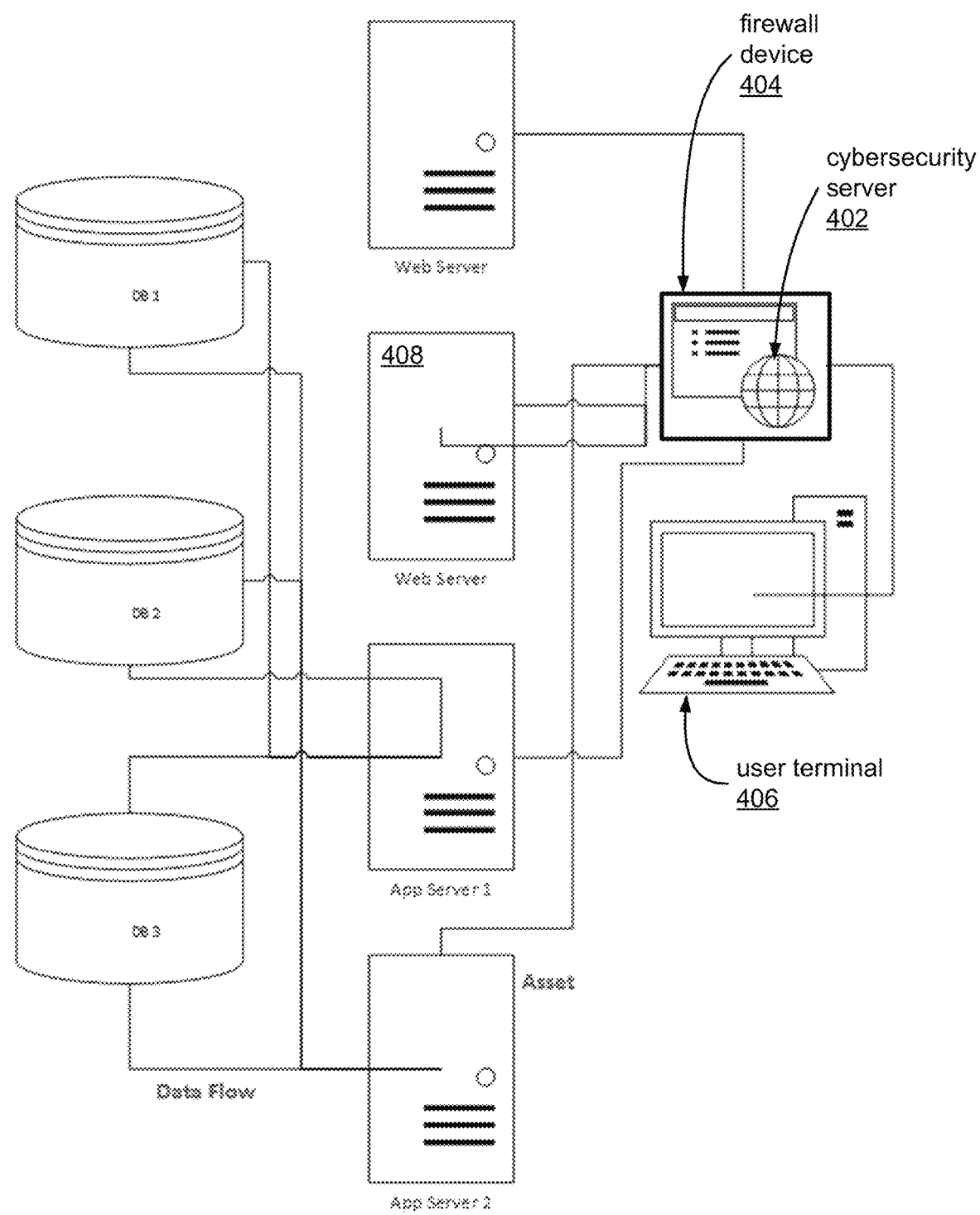
FIG. 4 illustrates a plurality of communicatively coupled, networked assets, in accordance with one or more implementations.

Like in FIG. 2, FIG. 4 is another illustrative system 400 for implementing methods according to the present disclosure. The system 400 comprises a plurality of communicatively coupled, networked assets. The plurality of networked assets may include, but are not limited to, a database server device (e.g., DB1, DB2, and DB3 shown in FIG. 4); an application server device (e.g., appServer1 and appServer2 as shown in FIG. 4); a web server device (e.g., two webServers as shown in FIG. 4); a user terminal 406; a firewall device 404; and other electronic devices in network communication.

The firewall device 406 may be configured to selectively restrict the data flow over the network 400, for example, the flow of data from a first asset to a second asset. In some examples, the firewall device 404 is configurable to operate in a low cybersecurity mode, medium cybersecurity mode, or high cybersecurity mode. The different cybersecurity modes help provide the networked assets with operational resiliency in the event of a cybersecurity threat (e.g., attack or simulated attack). When the firewall device 404 changes from operating in a low cybersecurity mode to a high cybersecurity mode, the firewall device 404 selectively restricting or blocks more of the data flow over the network 400. Although three cybersecurity modes (low, medium, high) have been described herein for illustration purposes, any number of modes and combination of modes may be implemented in accordance with the features disclosed herein.

In one example, a user terminal 406 may be launching a cybersecurity attack on the network 400. In response, the cybersecurity server 402 may transform the firewall device from operating in a low cybersecurity mode to a high cybersecurity mode, thus increasing the selective restriction of data flow from the user terminal 406 to the web server 408 to improve the operational resiliency of the computer network. In one example, the operating state of the firewall device may be additionally controlled by software and/or firmware of the cybersecurity server 402 residing at the firewall device 404. The cybersecurity server 402 may, as explained herein, adjust the cybersecurity mode based on the criticality score, which is shown in FIG. 6B, and/or trigger one or more remedial actions to transform the network 400 in order to improve its operational resiliency. Some examples of remedial actions as part of a mitigation strategy might include, but are not limited to: applying a patch to one or more assets of the plurality of networked assets; issuing a renewed security certificate, and/or physically altering an architecture of the plurality of networked assets. The criticality score of the network may be re-calculated, as shown in FIG. 6C, after the remedial action of the mitigation strategy have been completed.

Figure 5:
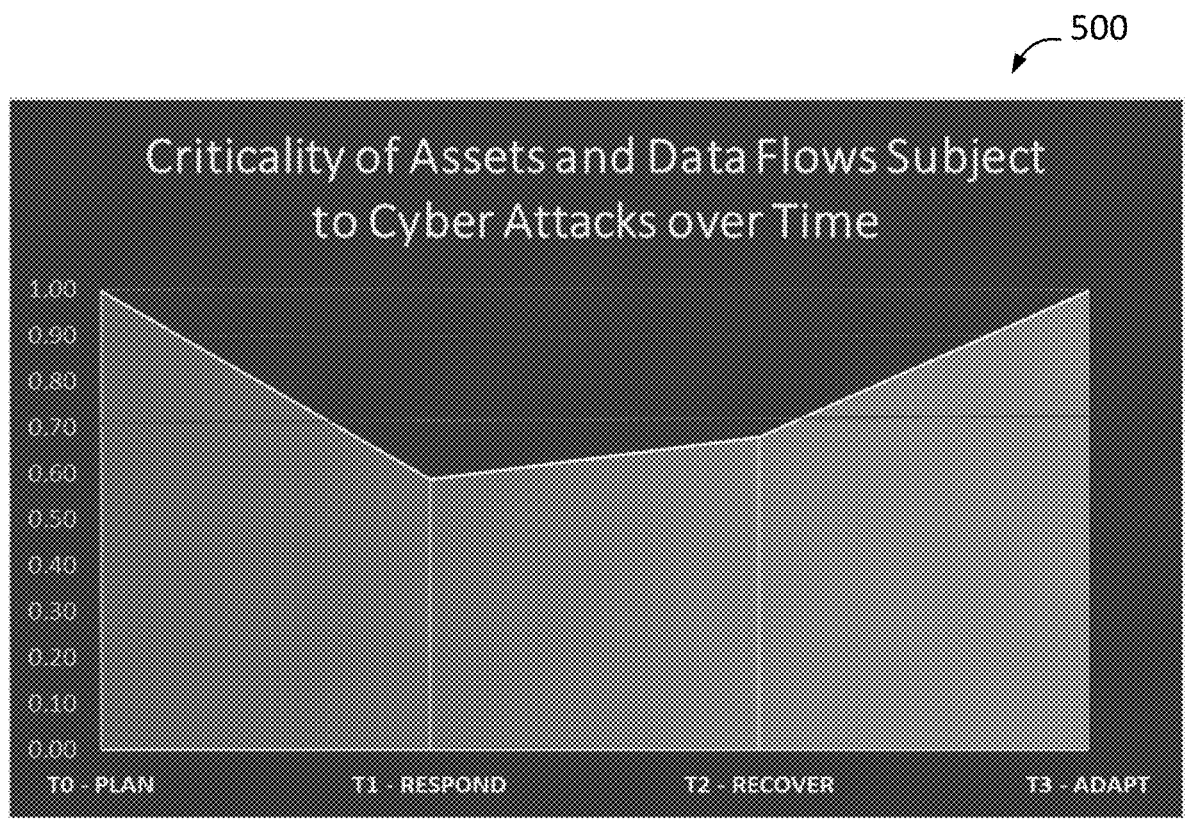
FIG. 5 is a line graph illustrating a criticality score calculated in accordance with one or more implementations.

Referring to FIG. 5, a line graph illustrates the criticality score calculated by the cybersecurity server 402 for each t time period including a plan-time-period t0, an absorb-time-period t1, a recover-time-period t2, and an adapt-time-period t3. A criticality score of "1" represents a network 400 with a high operational resiliency. Meanwhile, once an actual cybersecurity attack or a simulated cybersecurity threat is afflicted on the network 400, the criticality score decreases to 0.59 on a scale from zero to one when re-calculated at the absorb-time-period t1. Time t1 may occur at recurring intervals, random intervals, or upon trigger of an event such as a detection of symptoms of a cybersecurity attack. The graph 500 shows that at time period 0 (t0), the criticality (e.g., functioning level) score is necessarily set to 1 to indicate that the network 400 is fully functional. Meanwhile, when the cyber-attack takes place in time period 1 (t1), the criticality score is reduced to show the degraded operational resiliency of the network 400.

As the system 400 assesses and reacts to the increased cybersecurity risks, the criticality score should improve. For example, as a result of mitigating actions, the criticality score of the network 400 improves from 0.59 to 0.68 at a recover-time-period t2. While the example in the graph 500 shows only one attack/threat in time period t1, in other examples, there may be multiple attacks/threats during one or more time periods with varying impacts on the different networked assets (including data sources) in network 400. Note that if/when the operational resiliency of the network 400 is fully restored at the adapt-time-period t3, the criticality score returns to 1.0.

Of course, the amount of time and change in the criticality score will be dependent upon an ability to mitigate and respond to the cybersecurity risk. In some examples, the criticality score may continue to decline, and the cybersecurity server 402 may command the firewall device 404 to further elevate its cybersecurity mode to a high cybersecurity mode. In some instances, the firewall device 404 may temporarily shutdown all access to the network 400 to mitigate an extreme risk from a cybersecurity attack.

The criticality score may be calculated using a representation of asset-data flow pairings in the network 400. One example of a criticality function in accordance with various aspect of the disclosure, is as follows:

$$C(t, A, D, M) = \frac{\sum_{\in i\{A,D\}} w_i\ (t, M)\pi_i(t, M)}{\sum_{\in i\{A,D\}} w_i\ (t, M)}$$

where C is the critical functionality; T is the time period, for example, as shown in the graph 500 in FIG. 5; A,D is each asset-data flow pairing stored in the matrix representation stored in computer memory; M is a mitigation strategy; W is an importance value; and π is a probability that each asset-data flow pairing is functional during the cybersecurity threat.

In one example, M, W and π may be assigned as random probabilities between zero and one. In another example, as in real-world situations, the aforementioned values may be derived during the threat modeling phase of the assessment. The assessment may be performed, in some examples, by the cybersecurity server 402, by a subject matter expert (SME) knowledgeable about the network 400 and/or the asset (e.g., application) or data flow of concern in the threat, or by a hybrid approach involving a SME's decision being supplemented/complimented by the cybersecurity server 402. In addition to the criteria disclosed in FIG. 6A, FIG. 6B, FIG. 6C, and FIG. 6D, a SME and/or cybersecurity server 402 may also consider operational characteristics such as capacity, location, and others. These values may be derived from ranges entered into a built-in Monte Carlo simulation, in one example. For example, if the capacity of the network 400 is large, it may be unaffected by a high-volume phishing attack originating from user terminal 406. In another example, the location of the origination of the cybersecurity attack and/or the location of the networked asset 161 may be a consideration in determining a value for one or more of the aforementioned variables that are inputs into the criticality algorithm.

Referring to FIG. 6A, FIG. 6B, FIG. 6C, and FIG. 6D, a data store is illustrated with data about the operational resiliency of a network 400. The data in FIG. 6A, FIG. 6B, FIG. 6C, and FIG. 6D is populated, updated, and assessed in the application of one or more mathematical models to assess the operational resilience, in the face of myriad cyber security attacks, of a network 400. The aforementioned data is used for the derivation of an operational resilience value that can further be quantified into dollars and compared against impact tolerance. The model described herein may be used to measure operational resilience in the face of cyber-attacks.

In one example, the data in FIG. 6A, FIG. 6B, FIG. 6C, and FIG. 6D may be stored in tangible, non-transitory computer memory as a matrix representation of the plurality of networked assets in a network 400. The tangible, non-transitory computer memory may be a database server machine, or may be another form of data storage on a memory such as a flat file or graph database.

FIG. 6A depicts the asset-data pairing in a matrix representation with a directional component. Namely, the identification of the networked asset in the left/first column in FIG. 6A (e.g., application server 1 as reference number 602) denotes the start/origin of the data flow. Meanwhile, the top row in FIG. 6A (e.g., application server 2 as reference number 604) denotes the next destination/endpoint of the data flow. Each value in the "applicable assets and data flows" table in the matrix representation may be different even if the two networked assets involved in the communication (e.g., data flow) are the same. The asset-data flow pairing is defined by a directional data flow from a first asset to a second asset. In other words, if the start and end points are reversed, the values in the "applicable assets and data flows" table may be different.

In FIG. 6A, a "1" in the "applicable assets and data flows" table indicates that a data flow from the start asset to the end point asset exists and is applicable to the criticality score of the network 400. Meanwhile, a zero in the "applicable assets and data flows" table indicates that the data flow from the start asset to the end point asset is not applicable to the operational resilience of the network 400. For example, some networked assets may not be connected to others, and as such, their value would appropriately be zero in the "applicable assets and data flows" table. Moreover, where the start asset and the end point asset are the same in the "applicable assets and data flows" table, the value is routinely "1" to permit an assessment of the resiliency of the asset on its own. In some examples, the "applicable assets and data flows" table may be auto-populated, by a cybersecurity server 402, by accessing the system of record to identify which assets of the plurality of networked assets are communicatively coupled.

In FIG. 6A, a section 606 of the matrix representation also includes an importance value corresponding to the asset-data flow pairings. The "importance of assets and data flows" table 606 in the data store corresponds to a value between 0 and 1 that indicates the importance of the asset-data flow pairing to the operational resiliency of the network 400. The computer processor of the cybersecurity server may record the importance value in the matrix representation. Likewise, a table 608A in the matrix representation is populated and updated with (π) the probability that each asset-data flow pairing is functional during a cybersecurity threat. As shown in FIG. 6A, all cells in that table 608A are "1" to indicate that an attack on any networked asset would have an effect on the operational resiliency of the network 400. The values in that table are a numeric representation of the severity of a cybersecurity threat on the asset-data flow pairing.

At a recurring interval, or upon a triggering event, the matrix representation illustrated in FIG. 6A may be updated with current asset-data flow pairings based on an analysis of a system of record associated with the plurality of networked assets. Meanwhile, in response to detecting a cybersecurity threat, a computer processor of the cybersecurity server 402 may update the asset-data flow pairing stored in the matrix representation to indicate that specific assets are effected by the cybersecurity threat. The value stored in the table (or matrix representation) may represent a magnitude of effect on the target asset by the cybersecurity threat. Finally, the cybersecurity server 402 may calculate the values in the "importance of asset and data flow given the probability it remains functional during an attack" table 610A in FIG. 6A. In one example, the value is generated by multiplying the corresponding asset-data flow pairing value in table 606 with the value in table 608A. In the example illustrated in FIG. 6A, the values in table 610A are identical to table 606 because all values in table 608A are "1," however, in those examples where table 608A is not all 1s, the values in table 610A will differ.

After receiving the inputs depicted in FIG. 6A, the system calculates the criticality score 612A. The criticality score is an indication of the operational resiliency of the network 400. As explained with reference to FIG. 5, a criticality score of 1 conveys strong operational resilience of a network 400 subject to cybersecurity threats.

Referring to FIG. 6B, the impact of the cybersecurity attack is populated as value for each asset-data flow pairing in the "impact of attack" table 614B. Although the top row is omitted in FIG. 6B (and FIG. 6C and FIG. 6D), the existing asset-data flow pairing continues in these figures. The magnitude of the impact on the networked assets 161 may be determined, in some examples, by the cybersecurity server 402, by a subject matter expert (SME) knowledgeable about the network 400 and/or the asset (e.g., application) or data flow of concern in the attack, or by a hybrid approach involving a SME's decision being supplemented/complimented by the cybersecurity server 402. The values in table 614B indicate the impact of the cybersecurity attack/threat on each of the asset-data flowing pairings, where the larger the value, the greater the impact.

Meanwhile, tables 608B and 610B in FIG. 6B are counterparts to tables 608A and 610A in FIG. 6A. Of course, because at time t1, the effects on the operational resiliency of a cybersecurity attack have manifested on the network 400, the values in the counterpart tables in FIG. 6B are updated to reflect the values in the "impact of attack" table 614B. The values in table 608B are calculated by subtracting the corresponding value in the "impact of attack" table 614B from numeric one, and then multiplying by the corresponding value in table 608A, which in this example is all 1s. Therefore, table 608B is an objective assessment of the change in ($\pi$) the probability that each asset-data flow pairing is functional during a cybersecurity threat. In contrast to table 608A in FIG. 6A which contained all 1s, table 608B shows the effects of the cybersecurity attack on the probabilities. Likewise, table 610B is the counterpart of table 610A in FIG. 6A. The decrease in the values in table 610B reflects the effects of the cybersecurity attack on the importance of asset and data flow given the probability it remains functional during an attack. In this example, each of the values in table 610B decreased due to the cybersecurity attack.

After receiving the inputs depicted in FIG. 6B, the system calculates the updated criticality score 612B. The updated criticality score is an indication of the operational resiliency of the network 400 after the effects of the cybersecurity threats/attacks. In comparison to the previous criticality score 612A, the updated score 612B has decreased to reflect the decrease in operational resiliency of the network 400.

Referring to FIG. 6C, the "impact of attack" table 614C is reduced based on the beneficial effects of a mitigation strategy implemented to address the cybersecurity threat or attack. For example, FIG. 6C includes an impact of recovery effort 616C value to adjust all of the values in table 614B by an amount. While the example in FIG. 6C includes a uniform adjustment for all values in table 614B, in some examples, the adjustment may be customized for each asset-data flow pairing in FIG. 6C. In some examples, where the resulting value in table 614C is a negative value, the value is bottomed out at a zero value (as is depicted by the three cells with 0 values in table 614C.

As a consequence of the "impact of the attack" table 614C being updated, the values in the remaining tables in FIG. 6C also are updated accordingly. Like in FIG. 6B, in FIG. 6C, tables 608C and 610C are re-calculated using the updated values in the matrix representation of network 400. The values in table 608C are calculated by subtracting the corresponding value in the "impact of attack" table 614C from numeric one, and then multiplying by the corresponding value in table 608A, which in this example is all 1s. Therefore, table 608B is an objective assessment of the change in ($\pi$) the probability that each asset-data flow pairing is functional during a respond stage of a cybersecurity attack/threat. Likewise, table 610C is the counterpart of table 610B in FIG. 6B. The change in the values in table 610C reflects the effects of the mitigation strategy on the importance of asset and data flow given the probability it remains functional during an attack. Some examples of mitigation strategies include, but are not limited to applying a patch to one or more assets of the plurality of networked assets; issuing a renewed security certificate, and physically altering an architecture of the plurality of networked assets.

Like in FIG. 6B, after updating the values in FIG. 6C based on the impact of recovery effort value 616C, the system calculates the updated criticality score 612C. The updated criticality score is an indication of the operational resiliency of the network 400 after the initial effects of the mitigation strategy in response to a cybersecurity threat/attack. In comparison to the previous criticality score 612B, the updated score 612C has increased to reflect the improvement in operational resiliency of the network 400 as a result of the mitigation strategy.

Referring to FIG. 6D, which corresponds to an adapt time period (t3) the "impact of attack" table 614D is updated to reflect that all cybersecurity threats have been mitigated after completion of remedial actions. In the example in FIG. 6D, the values in the "impact of attack" table 614D have been updated to zero to reflect the improved operational resilience of the network 400. In some examples, the "impact of attack" table 614D might not fully recover from the cybersecurity threat, and the values in the table 614D might not be reduced to zero.

Moreover, as a consequence of the "impact of the attack" table 614D being updated to all zeros in the example of FIG. 6D, the values in the remaining tables in FIG. 6D also are updated accordingly. Tables 608D and 610D are re-calculated using the updated values in the matrix representation of network 400. The values in table 608D are calculated by subtracting the corresponding value in the "impact of attack" table 614D from numeric one, and then multiplying by the corresponding value in table 608A, which in this example is all 1s. Therefore, table 608B is an objective assessment of the change in ($\pi$) the probability that each asset-data flow pairing is functional during a respond stage of a cybersecurity attack/threat. In the example in FIG. 6D, the values are all 1s to reflect that the state of the operational resilience of the network 400 is returned to the state it was in at time t0 in the planning stage. Likewise, table 610D is the counterpart of table 610C in FIG. 6C and table 610A in FIG. 6A. Since the operational resilience of the network 400 has returned to its state from time t0, the values in table 610D are again identical to those in table 610A. Of course, with the state being returned to its initial operational resilience, the criticality score 612D is the same as in FIG. 6A. In some examples, the criticality score 612D may be different than score 612A if not all networked assets have returned to their pre-cybersecurity attack state.

Figure 7:
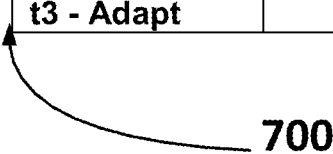
FIG. 7 is a table illustrating a criticality score calculated by a cybersecurity server, in accordance with one or more implementations.

Referring to FIG. 7, a table illustrates a criticality score calculated by the cybersecurity server 402 for each t time period including a plan-time-period t0, a respond-time-period (e.g., an absorb-time-period) t1, a recover-time-period t2, and an adapt-time-period t3. A criticality score of "1" represents a network 400 with a high operational resiliency similar to in FIG. 5. Moreover, the overall operational resiliency of a computer network 400 is, in one example, a measure of average functionality of the plurality of networked assets and data flows across a time interval, as defined by an algorithm:

$$\text{operational resiliency} = \left(\frac{1}{t_c}\right)\frac{1}{E}\sum_{E}\sum_{t=0}^{tc} C(t, A, D, M)$$

where C is the critical functionality described in FIG. 5; $t_c$ is the time period (or time under control, such as t0, t1, t2, t3); and E is all potential cybersecurity threats against an asset, data flow, or asset-data flow pairing during each time period $t_c$. The operational resilience algorithm may be further quantified as a dollar value (operational resilience* (1−Total Value of Critical Service) and compared to a defined impact tolerance as set by a SME or senior leadership. For example, FIG. 7 may serve as a digital dashboard 700 for senior leadership to quickly and efficiently measure the operational resilience of their network 400, including but not limited to the average resilience, robustness value, and risk value of the network 400 at each time period t0, t1, t2, t3. Prior to Applicants' disclosure herein, the process for measuring the robustness of a network to cybersecurity risk was cumbersome and had drawbacks. The digital dashboard 700 in FIG. 7 may, in some examples, be generated in a printable format, such as a PDF format, so that it may be printed and distributed to numerous senior leadership for review and decision-making. In some examples, the generated report may include a recommended mitigation strategy with remedial actions to improve the operational resilience of the network 400.

Figure 3:
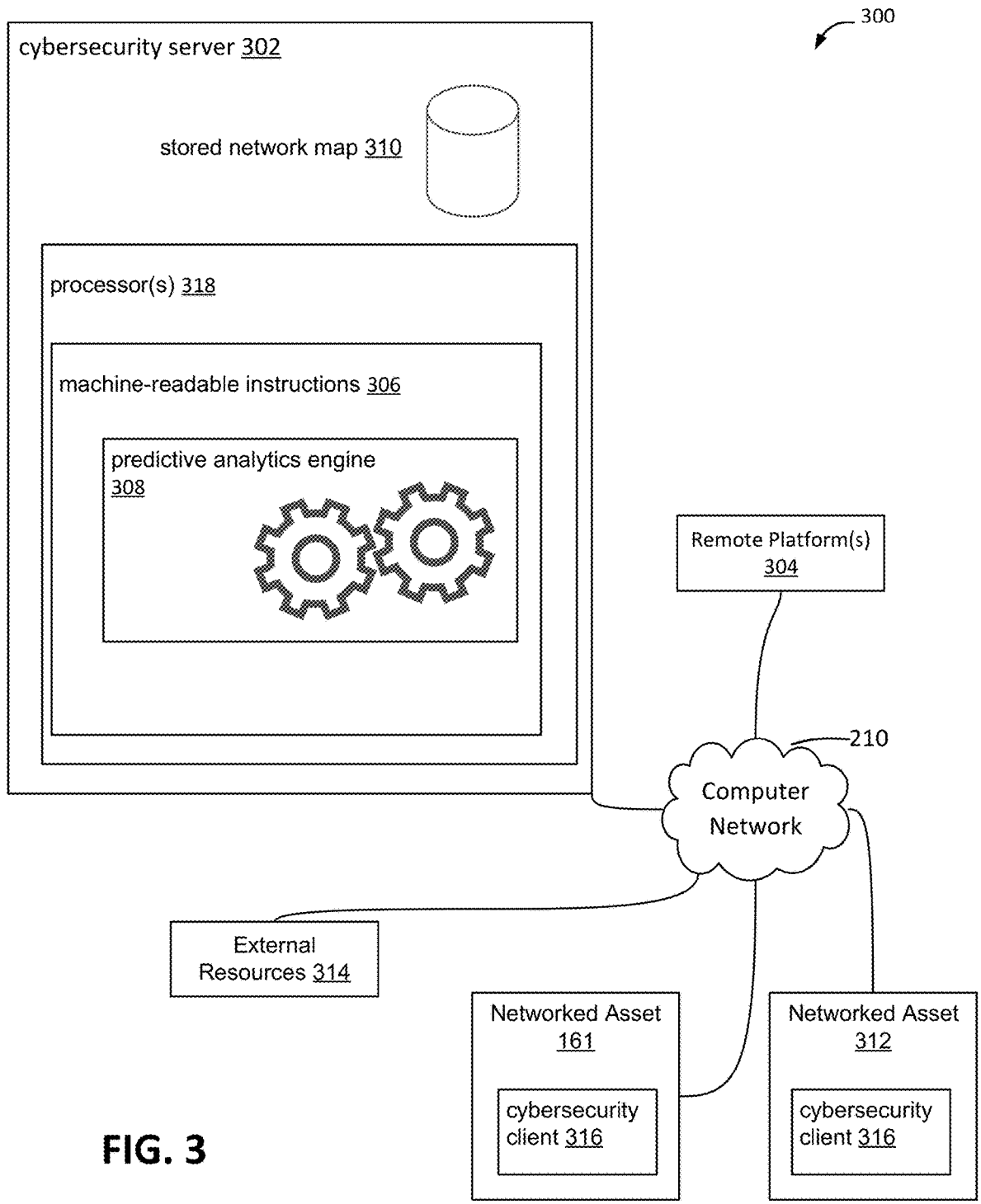
FIG. 3 illustrates a cybersecurity adaptation system configured for networked data communication, in accordance with one or more implementations.

FIG. 3 illustrates a cybersecurity adaptation system 300 configured for networked data communication, in accordance with one or more implementations. The cybersecurity adaptation system 300 may comprise a stored network map 310. The stored network map 310 may be populated with data from the system of record identifying which networked assets 161, 312 are communicatively coupled to the computer network 210 and their asset-data flow pairings, in accordance with the methods disclosed herein. In one example, the stored network map 310 may include a matrix representation of a plurality of communicatively coupled, networked assets 161, 312. When a first networked asset 161 communicates a data flow to a second networked asset 312, the asset and data flow correspond to an asset-data flow pairing stored in the matrix representation of the data store 310.

The cybersecurity server 302 may access the stored network map 310 to perform analytics on the network data and other data to calculate a magnitude of effect (e.g., values in table 614B in FIG. 6B) resulting from a cybersecurity threat/attack. For example, a predictive analytics engine 308 may be configured to calculate the magnitude of effect on a networked asset by the cybersecurity threat. The predictive analytics engine 308 may be executed by the computer processor 318 of the cybersecurity server 302.

In some examples, system 300 may include one or more cybersecurity server 302. Cybersecurity server 302 may be configured to communicate with one or more remote platforms 304 according to a client/server architecture, a peer-to-peer architecture, and/or other architectures. Remote platform(s) 304 may be configured to communicate with other connected devices to the computer network 210 via cybersecurity server 302 and/or according to a client/server architecture, a peer-to-peer architecture, and/or other architectures. Users may access system 300 via remote platform(s) 304, which may include one or more user terminals. In contrast to the network 400 in FIG. 4, which comprises a firewall device 404 that is configurable by a cybersecurity server 402 to selectively restricts data flow on the network 400, the computer network 210 in FIG. 3 is not illustrated with a physical firewall device. Instead, in some embodiments, networked assets 161, 312 may be equipped with a cybersecurity client 316 that executes on the networked asset 161, 312 to regulate the data flow to and/or from the networked asset 161, 312 over the computer network 210. The cybersecurity client 316 may be controlled by the cybersecurity server 302 through issuance of commands and/or instructions to the client 316. In other words, the cybersecurity client 316 may function as a thin-client to the fat-client embodiment in FIG. 4. In other examples, the firewall device 404 in FIG. 4 may be incorporate in a hybrid architecture with the system 300 in FIG. 3 to offer varying levels of protection.

In some implementations, system 300 may include an electronic messaging element, such as an API for an electronic mail system for sending notifications. The GPS location associated with GPS location attribute may have at least the longitude and latitude of the location to linked to a mapping application. In another example, the GPS location attribute might be based on a possible location corresponding to an IP address on the network.

The non-transitory storage media 310 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 310 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 310 may include one or more virtual storage resources (e.g., cloud storage, a virtual private network, and/or other virtual storage resources). Electronic storage 310 may store software algorithms, information determined by processor(s) 318, information received from cybersecurity server 302, and/or other information that enables cybersecurity server 302 to function as described herein. Moreover, cybersecurity server 302 may be configured by machine-readable instructions 306. Machine-readable instructions 306 may include one or more instruction modules including, but not limited to a predictive analytics engine 308. The instruction modules may include computer program modules.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308 and/or other modules. Processor(s) 318 may be configured to execute modules 308; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although module 308 is illustrated in FIG. 3 as being implemented within a single processing unit, in implementations in which processor(s) 318 includes multiple processing units, one or more of module 308 may be implemented remotely from the other modules. The description of the functionality provided by the different modules 308 described herein is for illustrative purposes, and is not intended to be limiting, as any of module 308 or other modules may provide more or less functionality than is described. For example, one or more of modules may be eliminated, and some or all of its functionality may be provided by other ones of modules. As another example, processor(s) 318 may be configured to execute one or more additional modules that may perform some or all of the functionality attributed to other modules.

Figure 8:
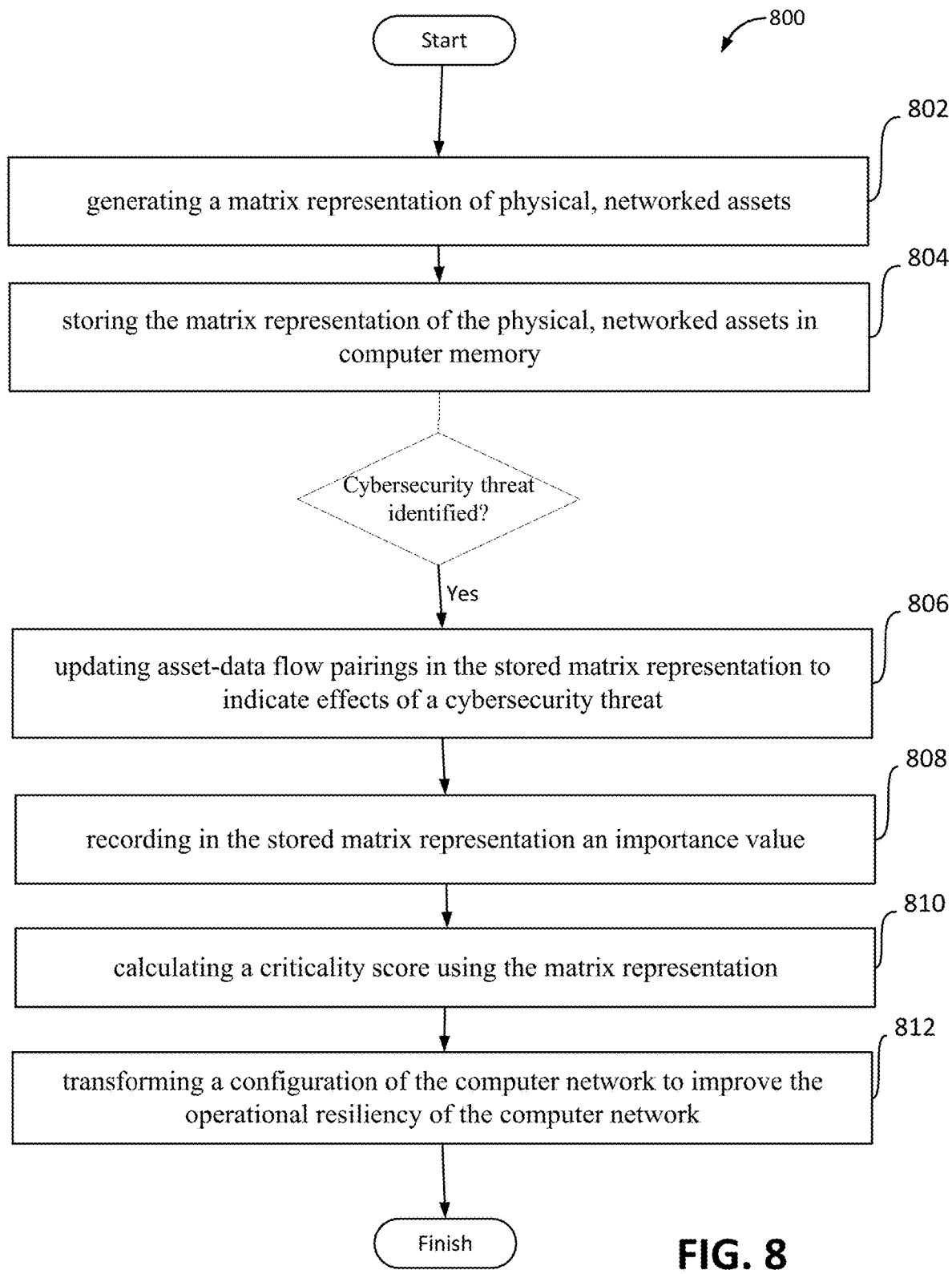
FIG. 8 is an illustrative flowchart of a method performed in accordance with one or more implementations.

FIG. 8 illustrates a flowchart of a method in accordance with one or more implementations disclosed herein. The operations of method 800 are intended to be illustrative. In some implementations, method 800 may be accomplished with one or more additional operations not described, and/or without one or more of the operations discussed. Additionally, the order in which the operations of method 800 are illustrated in the accompanying figures and described below is not intended to be limiting.

Step 802 in FIG. 8 comprises generating, by a computer processor, a data representation (e.g., matrix) of a plurality of physical, networked assets 300 communicatively coupled together. The automatic generating may be performed by analyzing a system of record associated with the plurality of physical, networked assets.

Step 804 in FIG. 8 comprises storing, in computer memory 310 by the computer processor 318, the data representation (e.g., matrix). The data representation comprises asset-data flow pairings corresponding to the networked assets on the computer network 210 and their connectivity.

Step 806 in FIG. 8 comprises updating, by the computer processor 318, the asset-data flow pairings 614B in the stored matrix representation 310 to indicate that networked assets 161, 132 are effected by a cybersecurity threat.

Step 808 in FIG. 8 comprises recording in the stored matrix representation 310, by the computer processor 318, an importance value 606 corresponding to a plurality of asset-data flow pairings in the matrix representation.

Step 810 in FIG. 8 comprises calculating a criticality score 612B, 612C using the matrix representation based on a criticality algorithm, as described herein.

Step 812 in FIG. 8 comprises transforming a configuration of the computer network 300 to improve the operational resiliency of the computer network by altering a cybersecurity mode of at least one asset 161 of the plurality of networked assets to another cybersecurity mode. For example, the operation and behavior of networked asset 161 may be updated by the cybersecurity client 316 updating the cybersecurity mode to further restrict data flow between the plurality of networked assets 300. The cybersecurity server 302 may send a command to the cybersecurity client 316 residing in the networked asset 161 to cause the change to the cybersecurity mode.

In some examples, the method steps 800 of FIG. 8 may operate on a system 400 with a plurality of physical, networked assets that include, but are not limited to, a database server device, an application server device, a web server device 408, a user terminal 406, and/or other networked devices. The method 800 may also include a firewall device 404 configured to selectively restrict the data flow from a first asset to a second asset of the plurality of physical, networked assets. The method 800 may also include steps to cause the firewall device to be configured to operate in a low, medium, or high cybersecurity mode. The method 800 may also include calculating, by a predictive analytics engine in a cybersecurity server 402, a magnitude of effect 614B on the assets 400 effected by a cybersecurity threat. The predictive analytics engine may be executed by the computer processor in a cybersecurity server 402 configured to measure cybersecurity threats effecting at least one of the plurality of physical, networked assets. The method 800 may further include calculating the criticality score for each t time period including a plan-time-period t0 and an adapt-time-period t3.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on a non-transient electronic storage medium. The one or more processing devices may include one or more devices configured through hardware, firmware, and/or software to be specifically designed for execution of one or more of the operations of method 800. For example, the steps of method 800 may be performed by one or more hardware processors configured by machine-readable instructions including a module that is the same as or similar to module 308, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A cybersecurity adaptation system to improve operational resiliency of a computer network, the system comprising:
   a matrix representation of a plurality of communicatively coupled, networked assets, wherein a first asset of the plurality of networked assets communicates a data flow to a second asset of the plurality of networked assets, wherein the first asset and the data flow correspond to an asset-data flow pairing stored in the matrix representation, wherein the plurality of networked assets comprise:

a database server device;
an application server device;
a web server device;
a user terminal; and
a firewall device configured to selectively restrict the data flow from the first asset to the second asset,
wherein the matrix representation of the plurality of networked assets is stored in a tangible computer memory; and
a cybersecurity server configured to measure a cybersecurity threat to at least one of the plurality of networked assets by:
in response to detecting the cybersecurity threat, updating, by a computer processor of the cybersecurity server, the asset-data flow pairing stored in the matrix representation to indicate that at least the second asset is effected by the cybersecurity threat;
analyzing a system of record associated with the plurality of networked assets to update the matrix representation with current asset-data flow pairings;
recording in the matrix representation, by the computer processor of the cybersecurity server, an importance value corresponding to a plurality of asset-data flow pairings stored in the matrix representation;
calculating a criticality score using the matrix representation based on a criticality function as follows:

$$C(t, A, D, M) = \frac{\Sigma_{\in i\{A,D\}}\ w_i\ (t, M)\pi_i(t, M)}{\Sigma_{\in i\{A,D\}}\ w_i\ (t, M)}$$

wherein, C=critical functionality; t=time period; A,D=each asset-data flow pairing stored in the matrix representation; M=a mitigation strategy; W=the importance value; and $\pi$=a probability that each asset-data flow pairing is functional during the cybersecurity threat; and
transforming, based on the calculated criticality score, the firewall device from one cybersecurity mode to another cybersecurity mode that increases the selective restricting of the data flow from the first asset to the second asset to improve the operational resiliency of the computer network.

2. The system of claim 1, where in the firewall device is configurable to operate in a low, medium, or high cybersecurity mode, and wherein the selectively restricting by the firewall device blocks the data flow more when the firewall device is in a high cybersecurity mode than when the firewall device is in a low cybersecurity mode.

3. The system of claim 1, further comprising a predictive analytics engine configured to calculate a magnitude of effect on the second asset by the cybersecurity threat.

4. The system of claim 3, wherein the predictive analytics engine is executed by the computer processor of the cybersecurity server.

5. The system of claim 1, wherein the matrix representation of the plurality of networked assets is auto-populated, by the cybersecurity server, by accessing the system of record to identify which assets of the plurality of networked assets are communicatively coupled.

6. The system of claim 1, wherein the updating of the asset-data flow pairing, which is stored in the matrix representation, to indicate that at least the second asset is effected by the cybersecurity threat comprises:
updating $\pi$ probability that the asset-data flow pairing is functional during the cybersecurity threat, in the matrix representation; and
updating the matrix representation with a numeric representation of a severity of the cybersecurity threat on the asset-data flow pairing.

7. The system of claim 1, wherein the asset-data flow pairing is defined by a directional data flow from the first asset to the second asset.

8. The system of claim 1, wherein the calculating the criticality score is performed for each T time period comprising a plan-time-period t0, an absorb-time-period t1, a recover-time-period t2, and an adapt-time-period t3.

9. The system of claim 1, wherein the calculating the criticality score is performed after the M mitigation strategy is applied to the matrix representation, wherein the M mitigation strategy comprises at least one of: applying a patch to one or more assets of the plurality of networked assets; issuing a renewed security certificate, and physically altering an architecture of the plurality of networked assets.

10. The system of claim 1, wherein the operational resiliency of the computer network is a measure of average functionality of the plurality of networked assets and data flows across a time interval, as defined by an algorithm:

$$\text{operational resiliency} = \left(\frac{1}{t_c}\right)\frac{1}{E}\sum_{E}\sum_{t=0}^{tc} C(t, A, D, M)$$

wherein, C=critical functionality; $t_c$=time period; and E=all potential cybersecurity threats against an asset, data flow, or asset-data flow pairing during each time period $t_c$.

11. A method for improving operational resiliency of a computer network, the method comprising:
generating, by a computer processor, a matrix representation of a plurality of physical, networked assets communicatively coupled together, by analyzing a system of record associated with the plurality of physical, networked assets;
storing, in computer memory by the computer processor, the matrix representation, wherein the matrix representation comprises asset-data flow pairings corresponding to the assets in the computer network and their connectivity;
updating, by the computer processor, the asset-data flow pairings in the matrix representation to indicate that assets are effected by a cybersecurity threat;
recording in the matrix representation, by the computer processor, an importance value corresponding to a plurality of asset-data flow pairings stored in the matrix representation;
calculating a criticality score using the matrix representation based on the following criticality function:

$$C(t, A, D, M) = \frac{\Sigma_{\in i\{A,D\}}\ w_i\ (t, M)\pi_i(t, M)}{\Sigma_{\in i\{A,D\}}\ w_i\ (t, M)}$$

wherein, C=critical functionality; t=time period; A,D=each asset-data flow pairing stored in the matrix representation; M=a mitigation strategy; W=the importance value; and $\pi$=a probability that each asset-data flow pairing is functional during the cybersecurity threat; and
transforming, based on the calculated criticality score, a configuration of the computer network to improve the operational resiliency of the computer network by altering a cybersecurity mode of at least one asset of the plurality of networked assets to another cybersecurity mode, wherein the another cybersecurity mode causes selective restricting of data flow between the plurality of networked assets.

12. The method of claim 11, wherein the plurality of physical, networked assets comprise:
   a database server device;
   an application server device;
   a web server device;
   a user terminal; and
   a firewall device configured to selectively restrict the data flow from a first asset to a second asset of the plurality of physical, networked assets.

13. The method of claim 12, wherein the firewall device is configurable to operate in a low, medium, or high cybersecurity mode, and wherein the selectively restricting by the firewall device restricts the data flow more when the firewall device is in a high cybersecurity mode than when the firewall device is in a low cybersecurity mode.

14. The method of claim 11, comprising:
   calculating, by a predictive analytics engine, a magnitude of effect on the assets effected by the cybersecurity threat.

15. The system of claim 14, wherein the predictive analytics engine is executed by the computer processor in a cybersecurity server configured to measure cybersecurity threats effecting at least one of the plurality of physical, networked assets.

16. The method of claim 11, wherein the calculating the criticality score is performed for each T time period comprising a plan-time-period t0 and an adapt-time-period t3.

17. The method of claim 11, wherein the calculating the criticality score is performed after the M mitigation strategy is applied to the matrix representation, wherein the M mitigation strategy comprises at least one of: applying a patch to one or more assets of the plurality of physical, networked assets; issuing a renewed security certificate, and physically altering an architecture of the plurality of physical, networked assets.

18. A tangible, non-transitory computer-readable medium storing computer-executable instructions that, when executed by a computer processor, cause a cybersecurity server to:
   generate, by the computer processor, a matrix representation of a plurality of networked assets communicatively coupled together, by analyzing a system of record associated with the plurality of networked assets;
   store, in a computer memory by the computer processor, the matrix representation, wherein the matrix representation comprises asset-data flow pairings corresponding to the assets of the plurality of networked assets and their connectivity;
   update, by the computer processor, the asset-data flow pairings in the matrix representation to indicate that assets are effected by a cybersecurity threat;
   record in the matrix representation, by the computer processor, an importance value corresponding to a plurality of asset-data flow pairings stored in the matrix representation;
   calculate, by the computer processor, a criticality score using the matrix representation based on the following criticality function:

$$C(t, A, D, M) = \frac{\Sigma_{\in i\{A,D\}} \, w_i \, (t, M) \pi_i(t, M)}{\Sigma_{\in i\{A,D\}} \, w_i \, (t, M)}$$

wherein, C=critical functionality; t=time period; A,D=each asset-data flow pairing stored in the matrix representation; M=a mitigation strategy; W=the importance value; and π=a probability that each asset-data flow pairing is functional during the cybersecurity threat; and
   transform, based on the calculated criticality score, a configuration of a computer network communicatively coupled to the cybersecurity server, to improve operational resiliency of the computer network by altering a cybersecurity mode of at least one asset of the plurality of networked assets to another cybersecurity mode, wherein the anther cybersecurity mode causes selective restricting of data flow between the plurality of networked assets.

19. The tangible, non-transitory computer-readable medium of claim 18, wherein the plurality of networked assets comprise a firewall device configured to operate in a low, medium, or high cybersecurity mode, and wherein the selectively restricting by the firewall device restricts the data flow more when the firewall device is in a high cybersecurity mode than when the firewall device is in a low cybersecurity mode.

20. The tangible, non-transitory computer-readable medium of claim 18, further storing computer-executable instructions that, when executed by the computer processor, cause the cybersecurity server to:
   calculate, by a predictive analytics engine, a magnitude of effect on the assets effected by the cybersecurity threat.

* * * * *